United States Patent [19]

Webster

[11] 3,853,943

[45] Dec. 10, 1974

[54] CYCLOPENTADIENES IN WHICH AT LEAST FOUR OF THE RING CARBONS CARRY CYANO SUBSTITUENTS AND METHODS FOR THEIR PREPARATION

[75] Inventor: Owen Wright Webster, Wilmington, Del.

[73] Assignee: E. I. du Pont de Nemours and Company, Wilmington, Del.

[22] Filed: June 15, 1970

[21] Appl. No.: 46,530

Related U.S. Application Data

[60] Division of Ser. No. 678,536, Oct. 27, 1967, Pat. No. 3,536,694, which is a continuation-in-part of Ser. No. 255,068, Jan. 30, 1963, abandoned.

[52] U.S. Cl. .................. 260/464, 149/18, 244/74, 260/141, 260/149, 260/152, 260/153, 260/154, 260/162, 260/163, 260/429 R, 260/429.5, 260/429.7, 260/429.9, 260/430, 260/431, 260/435 R, 260/438.1, 260/438.5 R, 260/439 CY, 260/447, 260/448 R, 424/210

[51] Int. Cl. . A01n 9/20, C06b 15/00, C07c 121/48

[58] Field of Search ...... 260/429 CY, 429 R, 429.5, 260/429.7, 141, 429.9, 430, 431, 435 R, 438.1, 464, 438.8 R, 439 CY, 447, 448 R

[56] References Cited
UNITED STATES PATENTS

| | | | |
|---|---|---|---|
| 3,144,477 | 8/1964 | Martin | 260/464 X |
| 3,226,420 | 12/1965 | Webster | 260/465 E |
| 3,278,514 | 10/1966 | Pauson | 260/149 |
| 3,297,743 | 1/1967 | Blanchard | 260/465.5 |
| 3,379,751 | 4/1968 | Webster | 260/464 |

OTHER PUBLICATIONS

Cookson et al., J. Chem Soc. (London), volume of 1966, Section e, pages 1641 to 1644.

Friedrich, Angew. Chem Internat. Edit., volume 5, No. 4, pages 420 to 421 (1966).

Webster (III), J. Am. Chem. Soc., Volume 87, pages 1820 to 1821, (1965).

Doering et al., J. Am. Chem. Soc., volume 75, pages 5955 to 5957, (1953).

Knox, Proceedings of the Chemical Society (London), Volume of 1959, pages 56 and 57.

Cookson et al., Proceedings of the Chemical Society (London), Volume of 1961, pages 117 and 118.

*Primary Examiner*—Floyd D. Higel

[57] ABSTRACT

Cyclization of a dialkali metal salt of 1,1,2,3-4,4-hexacyano-2-butenediide with acid yeilds 1-amino-2,3-4,5,5-pentacyanocyclopentadiene which is converted to 1-amino-2,3-4,5,5-tetracyanocyclopentadiene which is converted to 1-amino-2,3,4,5-tetracyanocyclopentadiene with strong mineral acid. Reaction of the pentacyanocyclopentadiene with nitrous acid gives 1-diaza-2,3,4,5-tetracyanocyclopentadiene which can be reacted with trialkyl or triaryl phosphorus to give 1-tri(aryl or alkyl)phosphazino-2,3,4,5-tetracyanocyclopentadiene. The diazotetracyanocyclopentadiene compound can be reacted with alkali metal compounds preferably under reducing condition to yield salts wherein the diazo group is replaced with hydrogen, amino, cyano, hydroxy, carboxy, alkoxycarbonyl, alkyl, aryl, p-hydroxyphenyl, nitro and mercapto groups. The cyanocyclopentadiene compounds are useful as rodenticides and as rocket propellants.

12 Claims, No Drawings

CYCLOPENTADIENES IN WHICH AT LEAST FOUR OF THE RING CARBONS CARRY CYANO SUBSTITUENTS AND METHODS FOR THEIR PREPARATION

CROSS-REFERENCE TO RELATED APPLICATIONS

This application is a division of my coassigned application Ser. No. 678,536, filed Oct. 27, 1967, now U.S. Pat. No. 3,536,694, itself a continuation-in-part of my application Ser. No. 255,068, filed Jan. 30, 1963, and now abandoned.

BACKGROUND OF THE INVENTION

1. Field of the Invention

This invention is related to a novel class of cyanocylopentadienes in which at least four of the ring carbons carry cyano substituents and to methods for their preparation.

2. Relation to the Prior Art

In a search of the prior art up to 1960, no cyanosubstituted cyclopentadienes were found. The following are believed to represent the closest art:

1. R. C. Cookson, J. Hudec, B. Whitear, Proc. Chem. Soc., 1961, 117.
2. H. Zollinger, "Azo and Diazo Chemistry," page 42, Interscience, 1961, lists diazocylopentadiene but no substituted diazocyclopentadienes.
3. W. Von E. Doering and C. H. DePuy, J. Am. Chem. Soc., 75, 5955 (1953).
4. G. R. Knox, Proc. Chem. Soc., 1959, 56.
5. P. L. Pauson and B. J. Williams, J. Chem. Soc., 1961, 4153.

SUMMARY AND DETAILS OF THE INVENTION

This invention is directed to cyanocyclopentadiene compounds in which at least four ring carbon atoms carry cyano substitutents, the compounds being: (1) 1-amino-2,3,4,5,5-pentacyanocyclopentadiene and decacyanoferrocene; (2) a zwitterion (dipolar ion; inner salt) of the formula

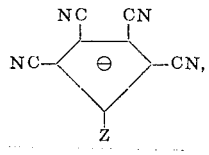

wherein:

Z is selected from the class consisting of $-N^+ \equiv N$, $-N^+H_3$, and $-N=N-P^+R_3$ wherein R contains up to and including 18 carbon atoms and is selected from the class consisting of alkyl and aryl; and (3) a cyclopentadienide acid or salt of the formula

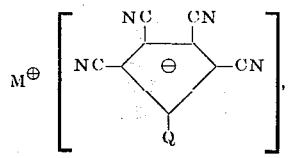

wherein;

$M^+$ represents one equivalent of an ion selected from the class consisting of hydrogen ion, metal ion, ammonium ion, and $C_{1-18}$ alkyl-substituted ammonium ion and Q is selected from the class consisting of hydrogen, amino, cyano, hydroxy, carboxy, alkoxycarbonyl wherein the alkoxy portion thereof contains up to and including 18 carbon atoms, halogen, $C_{1-18}$ alkyl, aryl of up to and including 18 carbon atoms, p-hydroxyphenyl, nitro, azido and mercapto.

In the above definition, by "alkyl" (for R and Q) is meant any aliphatically saturated hydrocarbon radical such as methyl, ethyl, butyl, dodecyl, octadecyl, and the like. By "aryl" (for R and Q) is meant an aromatic hydrocarbon radical such as phenyl, biphenyl, naphthyl, anthryl, chrysenyl and the like. The alkyl and aryl groups suitably contain 18 carbon atoms or less and have as substituents only other alkyl and aryl groups. Those groups containing eight carbon atoms or less (excluding substituents) are preferred. By "metal ion" (for $M^+$) is meant the ionic form of any metallic element, i.e., an element having an atomic number of 3, 4, 11–13, 19–32, 37–51, 55–84, 87–102, and above.

This invention is also directed to processes for producing the novel compounds by the cyclization of hexacyanobutenediide to 1-amino-2,3,4,5,5-pentacyanocyclopentadiene, the latter losing a cyano group in the presence of a nucleophilic agent to give aminotetracyanocyclopentadienide. Aminotetracyanocyclopentadienide is converted, inter alia, to diazotetracyanocyclopentadienide by nitrous acid. This in turn is converted (A) by a substitution reaction into pentacyanocyclopentadienide, tetracyanocyclopentadienide and halo-, i.e., chloro-, bromo-, and iodo-, mercapto-, nitro-, phenyl-, p-hydroxyphenyl-, carboxy- and azidotetracyanocyclopentadienide; and (B) by an addition reaction into triphenylphosphazinotetracyanocyclopentadienide.

In somewhat more detail, the novel compounds are prepared by treating a di(alkali metal) salt of a 1,1,2,3,4,4-hexacyano-2-butenediide with acid to obtain 1-amino-2,3,4,5,5-pentacyanocyclopentadiene, treating the 1-amino-2,3,4,5,5-pentacyanocyclopentadiene with a concentrated aqueous mineral acid (i.e., any mineral acid with an acidity function approximating that of 12N HCl) to obtain 1-amino-2,3,4,5-tetracyanocyclopentadiene or with nitrous acid at a pH below 1 to obtain 1-diazo-2,3,4,5-tetracyanocyclopentadiene, and treating the 1-diazo-2,3,4,5-tetracyanocyclopentadiene with trialkylphosphines or triarylphosphines to obtain, respectively, 1-trialkylphosphazino- and 1-triarylphosphazino-2,3,4,5-tetracyanocyclopentadienes or with reducing agents to obtain tetracyanocyclopentadienide and 1-substituted-2,3,4,5-tetracyanocyclopentadienide salts. The free acids, tetracyanocyclopentadiene and the 1-substituted-2,3,4,5-tetracyanocyclopentadienes, are prepared from their salts by treatment with an ion-exchange resin in acid form or by treatment of their silver salts with hydrochloric acid.

The equations below illustrate some of the new processes and products of the invention, the latter including 1-amino-2,3,4,5,5-pentacyanocyclopentadiene (formula I); the 1-diazo-, 1-amino-, and 1-trialkyl- and 1-triarylphosphazino-2,3,4,5-tetracyanocyclopentadiene zwitterion inner salts (formulas II, III and IV); the highly acidic tetracyanocyclopentadiene and 1-substituted-2,3,4,5-tetracyanocyclopentadienes, and the tetracyanocyclopentadienide and 1-substituted-2,3,4,5-tetracyanocyclopentadienide salts (formula V).

In these equations, $M_a$ is an alkali metal and R, Q and Z are as above.

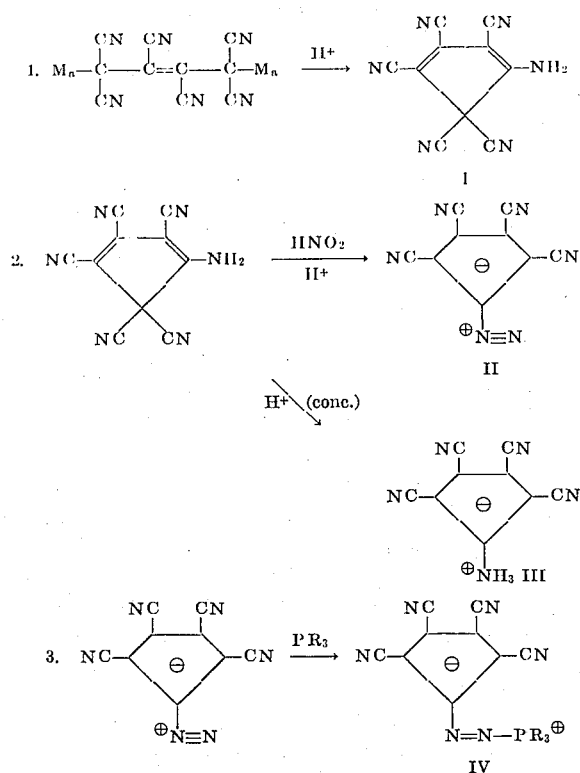

Some of the compounds of formula V can be prepared from azotetracyanocyclopentadiene by the reaction:

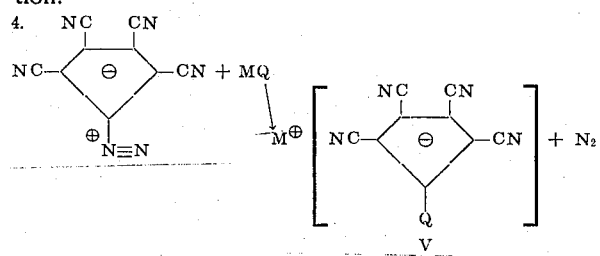

It will be understood that, in the process aspect of this reaction, M and Q are not both hydrogen, the acids being prepared, as noted above, for example, by ion-exchange reactions. The compounds of formula V represent a preferred embodiment of the invention, especially preferred being those in which Q is —H, —NH$_2$ and —CN.

Compounds of formula V in which Q is alkyl are readily prepared from alkali metal alkyls, e.g., as follows: Diazotetracyanocyclopentadiene is treated with a lithium alkyl such as lithium methyl. The resulting lithium methylazotetracyanocyclopentadienide is pyrolyzed to yield lithium 1-methyl-2,3,4,5-tetracyanocyclopentadienide. When lithium butyl is employed, lithium 1-butyl-2,3,4,5-tetracyanocyclopentadienide is obtained.

In an alternate procedure, it is sometimes desirable to hasten reaction (4) by using catalytic amounts of reducing agents such as copper metal, cuprous ion, cupric ion, zinc metal, or iodide ion. A catalyst is superfluous when the comound MQ is a reducing agent, particularly a reducing agent having a polarographic half-wave potential below +0.2 volt measured in acetonitrile, referred to a standard calomel electrode.

The processes of this invention are carried out in the presence of water or of an organic solvent which is inert to the reactants and products. Such solvents include lower alcohols (i.e., methanol, ethanol, butanol, etc.), acetonitrile, benzonitrile, and the like. Temperatures of reaction can vary in the range from —40° to 200° C. and above, a preferred range being from 0° to 100° C. Atmospheric pressure is preferred, but pressure is not a critical factor, and pressures both above and below atmospheric are operable.

In the examples which follow, parts are by weight unless otherwise indicated.

EXAMPLE 1

A solution of 50 parts of trans disodium 1,1,2,3,4,4-hexacyano-2-butenediide (U.S. Pat. No. 3,214,455; Ex. II) in 1000 parts of water is passed through a column of an ion-exchange resin in acid form (Amberlite IR-120). The resulting solution of 1,1,2,3,-4,4-hexacyano-2-butene is substantially free of sodium ion (flame test) and is strongly acidic. At room temperature bright yellow crystals quickly form as a precipitate from this solution. This is separated by filtration and dried to obtain 12.4 parts of 1-amino-2,3,4,5,5-pentacyanocyclopentadiene in the form of yellow crystals which decompose at 215°–230°C. without melting. The infrared absorption spectrum (mineral oil mull) is characterized by bands at 3,100, 2,210, 1,670, 1,600, 1,560, and 1,342 cm.$^{-1}$. The ultraviolet absorption spectrum of an acetonitrile solution of this product shows a maximum at 413 millimicrons with a molecular extinction coefficient of 7,000.

EXAMPLE 2

A mixture of 150 parts of trans disodium 1,1,2,3,4,4-hexacyano-2-butenediide, 150 parts of water 500 parts of an ion-exchange resin in acid form (Amberlite IR-120), and 3,570 parts of diethyl ether is stirred for 0.5 hour. The ether layer is separated, dried over calcium chloride, and clarified by treatment with activated carbon. Evaporation of the resulting solution gives 100 parts of 1-amino-2,3,4,5,5-pentacyanocyclopentadiene. This is purified by recrystallization from ether.

Anal. Calcd. for $C_{10}H_2N_6$: C, 58.3; H, 0.98; N, 40.8
Found: C, 58.5; H, 1.13; N, 40.6

EXAMPLE 3

1-Amino-2,3,4,5,5-pentacyanocyclopentadiene (100 parts) is stirred with 2550 parts of concentrated hydriodic acid (about 57 percent) at room temperature for about 15 minutes. The solid which forms is collected by filtration and dried to obtain 34 parts of aminotetracyanocyclopentadiene zwitterion. It is identified by its infrared absorption spectrum.

EXAMPLE 4

To 238 parts of concentrated hydrochloric acid at 0° C. is added 20 parts of 1-amino-2,3,4,5,5-pentacyanocyclopentadiene. The solution is allowed to warm to 20° C., and gas is evolved for about 5 minutes. The remaining mixture is then poured onto 200 parts of cracked ice. The precipitate which forms is collected by filtration and dried to obtain 5 parts of aminotetracyanocyclopentadiene zwitterion. It is purified by recrystallization from a mixture of acetonitrile and ethylene dichloride. The infrared absorption spectrum shows peaks at 3,200 and 2,600 cm.$^{-1}$, indicating a $NH_3^+$ group. The ulraviolet absorption spectrum of an acetonitrile solution of this product shows peaks at 335, 293, and 240 millimicrons.

Anal. Calcd. for $C_9H_3N_5$: C, 59.7; H, 1.65; N, 38.7
Found: C, 60.4; H, 2.20; N, 35.0

EXAMPLE 5

A solution of 100 parts of 1-amino-2,3,4,5,5-pentacyanocyclopentadiene in 7,890 parts of methanol is heated at reflux for 16 hours. During this time the yellow color fades. Evaporation of the resulting solution yields 136 parts of ammonium aminotetracyanocyclopentadienide which is identified by its infrared and ultraviolet light absorption spectra.

Anal. Calcd. for $C_9H_6N_6$: C, 55.6; H, 3.03; N, 42.4
Found: C, 55.4; H, 3.15; N, 41.9

EXAMPLE 6

A mixture of 30 parts of 1-amino-2,3,4,5,5-pentacyanocyclopentadiene and 40 parts of potassium iodide in 1,566 parts of acetonitrile is placed under a blanket of nitrogen and heated at reflux overnight. The reaction mixture is cooled to room temperature, filtered, and the filtrate is diluted with 7,135 parts of diethyl ether. A cream-colored precipitate, weighing 25 parts, is separated by filtration. This solid is dissolved in 392 parts of acetonitrile and passed through a column of alumina (Woelm, acid activity 1). Potassium aminotetracyanocyclopentadienide (the first band to appear) is separated and recrystallized from acetonitrile. UV $\lambda_{max}^{CH_3CN}$ 340 m$\mu$ ($\epsilon$ = 9,600), 296 m$\mu$ ($\epsilon$ = 10,420), 262 m$\mu$ ($\epsilon$ = 15,760), and 237 m$\mu$ ($\epsilon$ = 39,000).

Anal. Calcd. for $C_9H_2N_5K$: C, 49.3; H, 0.91; N, 32.0
Found: C, 49.6; H, 1.20; N, 31.2

EXAMPLE 7

Concentrated hydrochloric acid (119 parts) is cooled to 5° C. and 20 parts of 1-amino-2,3,4,5,5-pentacyanocyclopentadiene is added. The mixture is allowed to warm slowly. At about 15° C. gas evolution occurs, and cooling is necessary to hold the temperature between 15° and 20° C. After the evolution of gas ceases, the solution is poured into 1,000 parts of ice water containing 200 parts of sodium bicarbonate. The resulting mixture is filtered and to the filtrate is added 40 parts of tetraethylammonium bromide. The precipitate which forms is separated by filtration and dried to yield 20 parts of tetraethylammonium aminotetracyanocyclopentadienide. It is purified by recrystallization from water. (The gas evolved as noted in this example is trapped in a solution of $Ba(OH)_2$ in water. Barium carbonate is isolated and identified by its infrared spectrum.)

Anal. Calcd. for $C_{17}H_{22}N_6$: C, 65.3; H, 7.25; N, 27.6
Found: C, 65.5; H, 7.11; N, 27.4

EXAMPLE 8

A mixture of 100 parts of trans disodium 1,1,2,3,4,4-hexacyano-2-butenediide and 1190 parts of cold concentrated hydrochloric acid is allowed to warm slowly to 15° C. At this temperature gas evolution takes place for approximately 10 minutes. The resulting solution is poured into ice water containing an excess of sodium bicarbonate. The neutralized solution is filtered, and to the filtrate is added 200 parts of tetraethylammonium bromide. The precipitate which forms is collected by filtration, dried, and recrystallized from water to obtain 35 parts of tetraethylammonium aminotetracyanocyclopentadienide It is identified by its infrared spectrum.

EXAMPLE 9

A suspension of 608 parts of tetraethylammonium aminotetracyanocyclopentadienide in 20,000 parts of water and 1,190 parts of concentrated hydrochloric acid is cooled to 0° C., and a solution of 60 parts of sodium nitrite in 1,000 parts of water is added slowly during one-half hour. The reaction mixture is allowed to warm to room temperature during the next half hour. The insoluble portion is separated by filtration and treated with 1,190 parts of hydrochloric acid and 60 parts of sodium nitrite in 20,000 parts of water for 2 hours at room temperature. The remaining solid is collected by filtration and dried under reduced pressure to obtain 337 parts of diazotetracyanocyclopentadiene (zwitterion). It is purified first by recrystallization from ethylene dichloride and then from acetonitrile.

UV $\lambda_{max}^{CH_3CN}$ 331 m$\mu$ ($\epsilon$ = 14,950), 261.5 m$\mu$ ($\epsilon$ = 26,800), 252 m$\mu$ ($\epsilon$ = 29,400).

IR $\lambda_{max}^{Nujol}$ 4.44, 4.51, 6.60, 6.94, and 7.65 $\mu$.

Anal. Calcd. for $C_9N_6$: C, 56.3; N, 43.8
Found: C, 56.2; N, 43.2

EXAMPLE 10

To 238 parts of concentrated hydrochloric acid at 0° C. is added 20 parts of 1-amino-2,3,4,5,5-pentacyanocyclopentadiene. The mixture is stirred 45 minutes at 0°–5° C. and is then diluted with 1,000 parts of water. The diluted solution is treated with five parts of activated carbon and filtered. To the filtrate a solution of 15 parts of sodium nitrite in 50 parts of water is added portion-wise during a period of 10 minutes. The solid which forms is collected by filtration and dried to obtain 15 parts of diazotetracyanocyclopentadiene (zwitterion).

EXAMPLE 11

To about 300 parts of concentrated hydrochloric acid at 0° C. is added 25 parts of trans disodium 1,1,2,-3,4,4-hexacyano-2-butenediide. The solution is stirred for one-half hour and 15 parts of sodium nitrite in 15 parts of water is added slowly with stirring during the next 15 minutes. The solution is then diluted with 250 parts of water, and the insoluble portion is collcted by filtration and dried to obtain 11 parts of crude diazotetracyanocyclopentadiene (zwitterion).

EXAMPLE 12

A suspension of 100 parts of cuprous cyanide in 3,914 parts of acetonitrile is heated to reflux under a blanket of nitrogen. A solution of 95 parts of diazotetracyanocyclopentadiene in 1,566 parts of acetonitrile is added slowly during the next 15 minutes. Nitrogen (about 11 parts) is evolved. After the gas evolution has ceased, the reaction mixture is filtered to remove a precipitate and the filtrate is evaporated to dryness. The residue from the evaporation is dissolved in a solution of 200 parts of sodium cyanide in 20,000 parts of water. Two-hundred parts of tetraethylammonium chloride is added. The precipitate which forms (111 parts) is separated by filtration and recrystallized from water to obtain 30 parts of tetraethylammonium pentacyanocyclopentadienide, m.p. 357°–362° C.

UV $\lambda_{max}^{CH_3CN}$ 291 m$\mu$ ($\epsilon$ = 10,250), 281 m$\mu$ ($\epsilon$ = 10,850), 255 m$\mu$ ($\epsilon$ = 95,500), and 246 m$\mu$ ($\epsilon$ = 59,600).

IR $\lambda_{max}^{KBr}$ 4.50 m$\mu$ (Et$_4$N$^+$ bands not given)

Anal. Calcd. for $C_{18}H_{20}N_6$: C, 67.47; H, 6.29; N, 26.23
Found: C, 67.25; H, 6.21; N, 26.41

EXAMPLE 13

A mixture of 282 parts of tetraethylammonium chloride, 100 parts of copper powder, and 3941 parts of acetonitrile is heated to reflux, and 202 parts of diazotetracyanocyclopentadiene in 2,349 parts of acetonitrile is added portion-wise during the period of an hour. Nitrogen (about 28 parts) is evolved. The reaction mixture is then cooled, filtered, and the filtrate is concentrated by evaporation to about onefourth its original volume. The concentrate is diluted with 10,000 parts of water. The precipitate which forms is collected by filtration and dried to obtain 299 parts of tetraethylammonium chlorotetracyanocyclopentadienide. It is recrystallized three times from ethylene chloride to obtain a product melting at 243°–246° C.

Anal. Calcd. for $C_{17}H_{20}N_5Cl$:
C, 61.9; H, 6.11; N, 21.2; Cl, 10.8
Found: C, 61.5; H, 5.91; N, 21.3; Cl, 10.6

EXAMPLE 14

A solution of 96 parts of diazotetracyanocyclopentadiene and 319 parts of tetraethylammonium bromide in 3914 parts of acetonitrile is heated at 50° C. During the course of one-half hour, about 13 parts of nitrogen is evolved. The remaining solution is concentrated by evaporation and diluted with water. The precipitate which forms is collected by filtration and dried to obtain 147 parts of tetraethylammonium bromotetracyanocyclopentadienide. It is recrystallized three times from ethylene chloride and once from water to obtain a product melting at 226°–228° C.

Anal. Calcd. for $C_{17}H_{20}N_5Br$: C, 54.6; H, 5.39; N, 18.7
Found: C, 54.8; H, 5.44; N, 19.1

EXAMPLE 15

To an acetonitrile solution of diazotetracyanocyclopentadiene is added an acetonitrile solution of sodium iodide. Nitrogen is given off. When gas evolution ceases, the reaction mixture is diluted with an aqueous solution of tetraethylammonium chloride. Tetraethylammonium iodotetracyanocyclopentadienide separates as a solid and is identified by its infrared absorption spectrum.

EXAMPLE 16

A solution of 50 parts of sodium iodide in 548 parts of acetonitrile is stirred at room temperature, and a solution of 50 parts of diazotetracyanocyclopentadiene in 783 parts of acetonitrile is added portionwise during the period of a half hour. Nitrogen (about 7.6 parts) is evolved. The remaining solution is evaporated to dryness, and the residue dissolved in 1000 parts of water. The aqueous solution is treated with 50 parts of tetraethylammonium chloride. The precipitate which forms is collected by filtration and dried to obtain 91 parts of tetraethylammonium iodotetracyanocyclopentadienide. It is purified by recrystallization three times from ethylene dichloride and then once from water to obtain a product melting at 194.5°–195.5° C. UV $\lambda_{max}^{CH_3CN}$ 300 m$\mu$($\epsilon$ = 10,100), 290 m$\mu$ ($\epsilon$ = 9,700), 250 m$\mu$ ($\epsilon$ = 40,400), 243 m$\mu$ ($\epsilon$ = 42,800).

Anal. Calcd. for $C_{17}H_{20}N_5I$:
C, 48.5; H, 4.79; N, 16.6; I, 30.2
Found: C, 48.7; H, 4.69; N, 16.5; I, 29.9

EXAMPLE 17

A mixture of 96 parts of diazotetracyanocyclopentadiene and 50 parts of Cu$_2$(CN)$_2$ in 7,928 parts of methanol is heated at reflux for one-half hour. The reaction mixture is cooled to room temperature, filtered, and the filtrate is evaporated to dryness. The resulting residue is treated with a solution of 200 parts of sodium cyanide and 200 parts of tetraethylammonium chloride in water. The precipitate which forms is separated by filtration, washed with water, and dried to obtain 111 parts of tetraethylammonium tetracyanocyclopentadienide. It is recrystallized from water to obtain a product melting at 129°–130° C. UV $\lambda_{mas}^{CH_3CN}$ 298 m$\mu$ ($\epsilon$ = 14,500), 287 m$\mu$ ($\epsilon$ = 13,500), 244 m$\mu$($\epsilon$ = 56,800), 237 m$\mu$ ($\epsilon$ = 42,400).

IR $\lambda_{max}^{KBr}$ 4.55, 8.75, and 12.53 $\mu$ (Et$_4$N$^+$ bands not given).

Anal. Calcd. for $C_{17}H_{21}N_5$: C, 69.1; H, 7.17; N, 23.7
Found: C, 69.2; H, 7.26; N, 23.2

EXAMPLE 18

A suspension of 200 parts of copper powder, 20,000 parts of water, and 2200 parts of benzene is stirred at 50° C. and 384 parts of diazotetracyanocyclopentadiene is added. Nitrogen gas evolves as the diazo compound dissolves. After 1 hour 400 parts of NaHCO$_3$ is added and the reaction mixture stirred 15 minutes at room temperature. The copper and other solid products are separated by filtration and the water layer is collected and treated with 600 parts of tetramethylammonium bromide. The precipitate, which forms, is collected and dried. Tetramethylammonium phenyltetracyanocyclopentadienide, 85 parts, is extracted from the dried precipitate by hot ethylene chloride. The product is characterized by its infrared spectrum.

EXAMPLE 19

A solution of 96 parts of diazotetracyanocyclopentadiene in 1,566 parts of acetonitrile is treated with 141 parts of triphenylphosphine at room temperature. A red solution forms, and in a few minutes red crystals precipitate. Triphenylphosphazinotetracyanocyclopentadiene (210 parts) is collected by filtration. The product is recrystallized from acetonitrile.

Anal. Calcd. for C$_{27}$H$_{15}$N$_6$P:  C, 71.4; H, 3.33; N, 18.5
Found:  C, 71.5; H, 3.65; N, 18.2

EXAMPLE 20

To a stirred solution of 375 parts of silver pentacyanocyclopentadienide in 4,697 parts of acetonitrile is added 160 parts of ferrous chloride. The system is blanketed with nitrogen and contains small traces of moisture. After 0.5 hour the white precipitate of silver chloride which forms is removed by filtration and the filtrate is concentrated by evaporation to about one-sixth its original volume. The reaction mixture is allowed to stand for 2 hours at room temperature and light green crystals of decacyanoferrocene slowly form. The ferrocene is collected by filtration under nitrogen, washed with acetonitrile and dried at 112° C. and 0.3 mm. pressure. Decacyanoferrocene does not melt or sublime on heating at 340°C. at 0.5 mm pressure. (When an acetonitrile solution of decacyanoferrocene is exposed to the air, it quickly deposits a rust-colored solid.)

Anal. Calcd. for C$_{20}$N$_{10}$Fe.H$_2$O:  C, 52.9; H, 0.44; N, 30.9
Found:  C, 53.0; H, 0.57; N, 31.2

IR $\lambda_{max}^{Nujol}$ 3.00 and 6.1$\mu$ (water of hydration), 4.45$\mu$ (C ≡ N).
UV $\lambda_{max}^{CH_3CN}$ 291m$\mu$ ($\epsilon$ = 20,800), 281m$\mu$ ($\epsilon$ = 20,900), 255m$\mu$ ($\epsilon$ = 198,000) and 246m$\mu$ ($\epsilon$ = 121,000).

EXAMPLE 21

A solution of tetraethylammonium tetracyanocyclopentadienide in acetonitrile is treated first with silver nitrate and then with water to obtain silver tetracyanocyclopentadienide. A solution of 273 parts of silver tetracyanocyclopentadienide in 3,914 parts of acetonitrile is treated with 119 parts of concentrated hydrochloric acid. The silver chloride which precipitates is removed by filtration and the resulting strongly acidic solution is evaporated to dryness. There remains 145 parts of tetracyanocyclopentadiene which is identified by its infrared absorption spectrum.

EXAMPLE 22

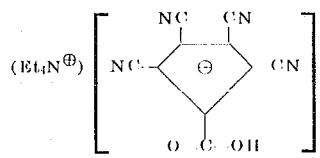

A mixture of 20 parts of diazotetracyanocyclopentadiene, 10 parts of copper powder, and 300 parts of water is placed in a stainless steel pressure vessel and pressured to 800 atmospheres with carbon monoxide. The reaction mixture is heated at 70° C. for 1 hour. It is then cooled to room temperature and excess CO is vented. The reaction mixture is filtered and 50 parts of tetraethylammonium chloride is added to the filtrate. A precipitate weighing 25 parts is collected by filtration. It is recrystallized once from ethylene chloride and twice from water to yield tetraethylammonium 1-carboxy-2,3,4,5-tetracyanocyclopentadienide in the form of cream-colored crystals melting at 273.5°–275° C. The infrared absorption spectrum indicates a tetraethylammonium ion, cyano groups, and a carboxy group (bands at 2.81, 2.92, 3.82, 3.96, 6.00, and 7.80 $\mu$).

Anal. Calcd. for C$_{18}$H$_{21}$N$_5$O$_2$:  C, 63.7; H, 6.24; N, 20.6
Found:  C, 64.0; H, 6.12; N, 20.7

When 1-carboxy-2,3,4,5-tetracyanocyclopentadiene or one of its salts is treated with a diazoalkane, the corresponding alkoxycarbonyl compound is obtained. For example, when tetraethylammonium 1-carboxy-2,3,4,5-tetracyanocyclopentadienide is treated with diazomethane, tetraethylammonium 1-methoxycarbonyl-2,3,4,5-tetracyanocyclopentadienide is obtained.

EXAMPLE 23

To a mixture of 1,000 parts of phenol, 500 parts of zinc powder and 50,000 parts of water is added 1,000 parts of diazotetracyanocylcopentadiene in small portions. After gas evolution ceases (approximately 1 hr.), the mixture is filtered and the filtrate is treated with 2,000 parts of tetramethylammonium chloride. The gummy precipitate which forms is recrystallized from hot water. The resulting product is extracted with ethyl acetate and the ethyl acetate soluble portion is recrystallized from water. The resulting purified tetramethylammonium 1-(4-hydroxyphenyl)-2,3,4,5-tetracyanocyclopentadienide weighs about 50 parts and melts at 260°–265° C. with decomposition. The above procedure is repeated and the crude product is purified by chromatography on alumina (Woelm, acid activity 1) with ethyl acetate and acetonitrile wash. The yield of tetramethylammonium 1-(4-hydroxyphenyl)-2,3,4,5-tetracyanocyclopentadienide is 225 parts.

Anal. Calcd. for $C_{19}H_{17}N_5O$: C, 68.9; H, 5.17; N, 21.1
Found: C, 68.8; H, 5.05; N, 21.0

IR $\lambda_{max}^{KBr}$ 3.02, 4.53, 6.16, 6.53, 6.72, 6.82, 6.92, 7.00, 7.26, 7.87, 8.12, 8.42, 10.53 and 11.95$\mu$
UV $\lambda_{max}^{CH_3CN}$ 264m$\mu$ ($\epsilon$ = 37,600).

EXAMPLE 24

A mixture of 40 parts of diazotetracyanocyclopentadiene, 28 parts of sodium nitrite, and 1,000 parts of water is heated at 80° C. for 0.5 hour. Nitrogen is evolved and the salts dissolve. To the hot solution is added 50 parts of tetraethylammonium chloride and the precipitate which forms is collected by filtering the hot mixture. The precipitate (35 parts) of crude tetraethylammonium 1-nitro-2,3,4,5-tetracyanocyclopentadienide is dried and chromatographed on alumina (Woelm, acid activity 1) with ethyl acetate/acetonitrile wash. The first band (15 parts, yellow) is collected and heated at 280° C./1 atm. for 3 hours in an open tube. The product, now light gray, is recrystallized from ethanol to give white tetraethylammonium 1-nitro-2,3,4,5-tetracyanocyclopentadienide which melts at 370° C. with decomposition. This compound turns yellow in the presence of light.

Anal. Calcd. for $C_{17}H_{20}O_2N_6$: C, 60.0; H, 5.92; N, 24.7
Found: C, 60.2; H, 6.37; N, 24.5

IR $\lambda_{max}^{KBr}$ 4.48, 6.54, 6.72, 7.46, 11.32, 13.18 and 13.50$\mu$
UV $\lambda_{max}^{CH_3CN}$ 349m$\mu$ ($\epsilon$ = 3650), 273m$\mu$ ($\epsilon$ = 31,200), 265m$\mu$ ($\epsilon$ = 29,050), and 211m$\mu$ ($\epsilon$ = 25,250)

When tetraethylammonium 1-nitro-2,3,4,5-tetracyanocyclopentadienide is refluxed with zinc and hydrochloric acid, tetraethylammonium 1-amino-2,3,4,5-tetracyanocyclopentadienide is formed. This product is characterized by its infrared spectrum.

EXAMPLE 25

To a solution of 65 parts of sodium azide in 2000 parts of water is slowly added 196 parts of diazotetracyanocyclopentadiene. Gas evolves slowly at room temperature. After 0.5 hour, 200 parts of tetraethylammonium chloride is added and 300 parts of white tetraethylammonium 1-azido-2,3,4,5-tetracyanocyclopentadienide is collected by filtration and dried. The product turns light orange after drying overnight in air. The product is recrystallized from ethanol to obtain 150 parts of the purified compound which melts at 120°–125° C. with decomposition.

Anal. Calcd. for $C_{17}H_{20}N_8$: C, 60.7; H, 5.99; N, 33.3
Found: C, 61.6; H, 6.11; N, 33.4

IR $\lambda_{max}^{Nujol}$ 4.52, 4.60, 4.75, 7.88, and 11.18$\mu$(Et$_4$N$^+$bands not given)

UV $\lambda_{max}^{CH_3CN}$ 300m$\mu$ ($\epsilon$ = 9,560), 270 m$\mu$ ($\epsilon$ = 34,500), and 257m$\mu$ ($\epsilon$ = 39,400)

EXAMPLE 26

A solution of 200 parts of diazotetracyanocyclopentadiene and 165 parts of ethyl potassium xanthate in 7,828 parts of acetonitrile is slowly heated to reflux. Nitrogen evolution becomes vigorous at about 50° C. The reaction mixture is heated under reflux for 0.5 hour and then cooled and evaporated to dryness. The residue is dissolved in a warm solution of 2,000 parts of potassium hydroxide in 15,000 parts of water and is allowed to stand for 0.5 hour. The basic solution is then acidified with dilute hydrochloric acid (precautions being taken to absorb the fumes in aqueous potassium hydroxide). The acid solution is treated with 1,000 parts of tetraethylammonium chloride and the crude tetraethylammonium 1-mercapto-2,3,4,5-tetracyanocyclopentadienide which precipitates (225 parts) is collected and dried. After two recrystallizations from ethanol, the purified product weighs 170 parts and melts at 275°–280° C. with decomposition.

Anal. Calcd. for $C_{17}H_{21}N_5S$: C, 62.3; H, 6.41; N, 21.4; S, 9.80
Found: C, 61.9; H, 6.04; N, 21.7; S, 10.0

IR $\lambda_{max}^{KBr}$ 3.70 and 4.52$\mu$ (Et$_4$N$^+$bands not given)

UV $\lambda_{max}^{CH_3CN}$ 340m$\mu$ ($\epsilon$ = 4,000), 271m$\mu$ ($\epsilon$ = 22,200), and 233m$\mu$ ($\epsilon$ = 22,700)

The cyanocyclopentadiene compounds of this invention contain at least four cyano substituents on ring carbon atoms. Salts of these tetra- and pentacyanocyclopentadiene compounds have the surprising characteristic of being chemically stable to handling in air. This is in sharp contrast to cyclopentadiene compounds without these substituents. For example, sodium cyclopentadienide must be carefully protected from air or oxygen to prevent decomposition.

Compounds of formula V where M is hydrogen are readily obtained by adding concentrated hydrochloric acid to an acetonitrile solution of one of the corresponding silver salts as illustrated in Example 21. The free acid is obtained as an acetonitrile solution from which it is recovered by evaporation.

When aqueous solutions of these acids react with metal oxides or hydroxides or ammonium or sulfonium hydroxides, the corresponding salts are obtained. Those salts which are insoluble in water precipitate, and are recovered by filtration. The soluble salts are recovered by evaporation. Thus, when one of the 1-substituted-2,3,4,5,-tetracyanocyclopentadienes, for example, 1,2,3,4,5-pentacyanocyclopentadiene, reacts in an aqueous solution with an oxide or hydroxide of $Li^+$, $Na^+$, $Mg^{++}$, $Al^{+++}$, $K^+$, $Ca^{++}$, $Ti^{++++}$, $Cr^{+++}$, $Mn^{++}$, $Fe^{++}$, $Fe^{+++}$, $Co^{++}$, $Co^{+++}$, $Ni^{++}$, $Ni^{+++}$, $Cu^{++}$, $Zn^{++}$, $Rb^+$, $Sr^{++}$, $Mo^{+++}$, $Ag^+$, $Cd^{++}$, $Sn^{++}$, $Cs^+$, $Ba^{++}$, $Hg^{++}$, $Pb^{++}$, or $Bi^{+++}$, the corresponding 1,2,3,4,5-pentacyanocyclopentadienide salts are formed. The corresponding ammonium tetramethylammonium, and trimethylsulfonium salts are similarly prepared.

In a like manner, tetracyanocyclopentadiene, prepared as in Example 21, is dissolved in water and is reacted with the oxides or hydroxides of the metals noted above to form the corresponding metal, ammonium, tetraalkylammonium, and trialkylsulfonium 1,2,3,4-tetracyanocyclopentadienide salts.

Other salts of this invention are similarly obtained. Tetraethylammonium pentacyanocyclopentadienide of Example 12, tetraethylammonium 1-chloro-2,3,4,5-tetracyanocyclopentadienide of Example 13, tetraethylammonium 1-bromo-2,3,4,5-tetracyanocyclopentadienide of Example 14, and tetraethylammonium 1-iodo-2,3,4,5-tetracyanocyclopentadienide of Example 16 are converted to their silver salts with silver nitrate in acetonitrile and the silver salts are treated with hydrochloric acid to obtain, respectively, 1,2,3,4,5-pentacyanocyclopentadiene, 1-chloro-2,3,4,5-tetracyanocyclopentadiene, 1-bromo-2,3,4,5-tetracyanocyclopentadiene and 1-iodo-2,3,4,5-tetracyanocyclopentadiene. These acids are reacted in turn with the oxides and hydroxides noted above to obtain the corresponding metal, ammonium, tetraalkylammonium, and trialkylsulfonium salts.

As indicated in Examples 5, 6, and 7, salts of 1-amino-2,3,4,5-tetracyanocyclopentadiene can be prepared directly from 1-amino-2,3,4,5,5-pentacyanocyclopentadiene by the action of alcohols, alkali metal iodides, or concentrated hydrogen halide acids, followed by neutralization. These salts in turn may be treated with nitrous acid to obtain 1-diazo-2,3,4,5-tetracyanocyclopentadiene as shown in Example 9.

U.S. Pat. No. 3,214,455 shows the preparation of disodium 1,1,2,3,4,4-hexacyano-2-butenediide by heating the disodium salt of 1,1,2,2-tetracyanoethane. Other alkali metal and alkaline earth metal 1,1,2,3,4,4-hexacyano-2-butenediide starting materials are similarly prepared by heating the corresponding alkali and alkaline earth metal salts of tetracyanoethane. Metal salts of 1,1,2,2-tetracyanoethane are shown in U.S. Pat. No. 2,788,356.

UTILITY

All the products of this invention are useful as thrust-producing propellants and as rat poisons or rodenticides. These utilities are illustrated below:

EXAMPLE A

An intimate mixture of 0.5 g. of diazotetracyanocyclopentadiene and 0.5 g. of KClO$_4$ is packed into a copper tube approximately 5 mm. in diameter × 10 cm., closed at one end. The tube is suspended by a cord and the open end is ignited by a flame. The rocket is impelled in a circular path as the fuel burns.

EXAMPLE B

The procedure of Example A is repeated using 0.5 g. of tetraethylammonium tetracyanocyclopentadienide and 0.5 g. of KClO$_4$. The rocket is impelled in a circular path as the fuel burns.

When 1-amino-2,3,4,5,5-pentacyanocyclopentadiene, 1-amino-2,3,4,5,5-pentacyanocyclopentadiene zwitterion, 1-(triphenylphosphazino)-2,3,4,5-tetracyanocyclopentadiene zwitterion, 1,2,3,4,5-pentacyanocyclopentadiene, decacyanoferrocene, or tetraethylammonium 1-chloro-2,3,4,5-tetracyanocyclopentadienide is substituted for 1-diazo-2,3,4,5-tetracyanocyclopentadiene in the procedure of Example A or B, above, rocket propulsion is obtained.

As noted, all the compounds of this invention are also useful as rat poisons since all of them are degraded in the mammalian stomach to yield cyanide ion. This is illustrated as follows:

EXAMPLE C

Tetraethylammonium tetracyanocyclopentadienide was ground fine and suspended in peanut oil at 15 percent concentration (Suspension A) and at 1 percent concentration (Suspension B). It was administered to young adult male rats by intragastric intubation in single dosages as indicated in the following table:

| RAT | SUSPENSION | DOSAGE (mg/kg) | RESULTS |
| --- | --- | --- | --- |
| 1 | A | 2250 | Died in 60 A |
| 2 | A | 670 | Died in 35 min. |
| 3 | B | 130 | Died in 50 min. |
| 4 | B | 90 | Died in 90 min. |
| 5 | B | 60 | Died in 1 day |
| 6 | B | 40 | Survived (14 days) |

The rats which died showed pulmonary edema and congestion, vacuolar changes in liver and kidney and a positive test for cyanide ion in stomach contents.

Substitution of any of the other compounds of this invention for the tetraethylammonium tetracyanocyclopentadienide of Example C in the tests there described gives similar results.

Since obvious modifications and equivalents will be evident to those skilled in the chemical arts, I propose to be bound solely by the appended claims.

I claim:

1. A cyanocyclopentadiene compound in which at least four ring carbon atoms carry cyano substituents, said compound selected from the group consisting of:

1-amino-2,3,4,5,5-pentacyanocyclopentadiene; and a compound of the formula

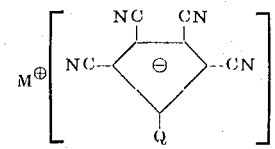

wherein:
M$^+$ represents one equivalent of an ion selected from the class consisting of hydrogen ion, metal ion, ammonium ion, and C$_{1-18}$ alkyl-substituted ammonium ion wherein the metal ion is selected from Li$^+$, Na$^+$, Mg$^{++}$, Al$^{+++}$, K$^+$, Ca$^{++}$, Ti$^{++++}$, Cr$^{+++}$, Mn$^{++}$, Fe$^{++}$, Fe$^{+++}$, Co$^{++}$, Co$^{+++}$, Ni$^{++}$, Ni$^{+++}$, Cu$^{++}$, Zn$^{++}$, Rb$^+$, Sr$^{++}$, Mo$^{+++}$, Ag$^+$, Cd$^{++}$, Sn$^{++}$, Cs$^+$, Ba$^{++}$, Hg$^{++}$, Pb$^{++}$, or Bi$^{+++}$; and Q is selected from the class consisting of hydrogen, amino, cyano, hydroxy, carboxy, alkoxycarbonyl wherein the alkoxy portion thereof contains up to and including 18 carbon atoms, chlorine, bromine, iodine C$_{1-18}$ alkyl, aryl of up to and including 18 carbon atoms, p-hydroxyphenyl, nitro, and mercapto.

2. A cyanocyclopentadiene compound of claim 1 having the formula

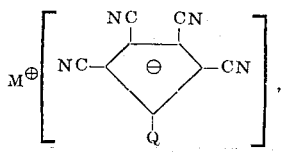

wherein:
M⁺ represents one equivalent of an ion selected from the class consisting of hydrogen ion, metal ion, ammonium ion, and $C_{1-18}$ alkyl-substituted ammonium ion wherein the metal ion is selected from $Li^+$, $Na^+$, $Mg^{++}$, $Al^{+++}$, $K^+$, $Ca^{++}$, $Ti^{++++}$, $Cr^{+++}$, $Mn^{++}$, $Fe^{++}$, $Fe^{+++}$, $Co^{++}$, $Co^{+++}$, $Ni^{++}$, $Ni^{+++}$, $Cu^{++}$, $Zn^{++}$, $Rb^+$, $Sr^{++}$, $Mo^{+++}$, $Ag^+$, $Cd^{++}$, $Sn^{++}$, $Cs^+$, $Ba^{++}$, $Hg^{++}$, $Pb^{++}$, or $Bi^{+++}$; and Q is selected from the class consisting of hydrogen, amino, cyano, hydroxy, carboxy, alkoxycarbonyl wherein the alkoxy portion thereof contains up to and including 18 carbon atoms, chlorine, bromine, iodine $C_{1-18}$ alkyl, aryl of up to and including 18 carbon atoms, p-hydroxyphenyl, nitro, and mercapto.

3. The compound of claim 2 wherein M⁺ represents a metal ion and Q represents cyano.

4. The compound of claim 1 named 1-amino-2,3,4,5,5-pentacyanocyclopentadiene.

5. The compound of claim 1 named tetracyanocyclopentadiene.

6. The compound of claim 1 named ammonium aminotetracyanocyclopentadiene.

7. The compound of claim 1 named aminotetracyanocyclopentadiene.

8. The compound of claim 1 named tetraethylammonium 1-carboxy-2,3,4,5-tetracyanocyclopentadienide.

9. The process which comprises contacting and reacting the compound of claim 4 with a solution of concentrated strong mineral acid and recovering the resultant aminotetracyanocyclopentadiene.

10. The process which comprises heating at reflux a solution of the compound of claim 4 in a lower alkanol and recovering the resultant ammonium aminotetracyanocyclopentadienide.

11. The process which comprises heating at reflux a mixture of the compound of claim 4 and an alkali metal iodide in an inert organic solvent and recovering the resultant alkali aminotetracyanocyclopentadienide.

12. The process which comprises
contacting and reacting a solution of cold concentrated strong mineral acid with a compound selected from the group consisting of 1-amino-2,3,4,5,5-pentacyanocyclopentadiene and dialkali metal salts of 1,1,2,3,4,4-hexacyano-2-butene,
maintaining the reaction mixture at a temperature below about 20° C.,
neutralizing said acid solution,
reacting the resultant neutralized solution with a tetraalkyl-$C_{1-18}$ substituted ammonium ion, and
recovering the resultant tetraalkyl-substituted ammonium aminotetracyanocyclopentadienide of claim 2.

* * * * *

UNITED STATES PATENT OFFICE
CERTIFICATE OF CORRECTION

PATENT NO. : 3,853,943
DATED : December 10, 1974
INVENTOR(S) : Owen Wright Webster It is certified that error appears in the above-identified patent and that said Letters Patent are hereby corrected as shown below:

Cover page, top of second column - "Section e" should be --Section c--;

Abstract, line 1 - "3-4" should be --3,4--;

Abstract, line 2 - correct spelling of "yields";

Abstract, line 4 - "2,3-4,5,5" should be --2,3,4,5--;

Col. 4, line 38 - insert a comman after "water";

Col. 8, line 58 - "mas" should be --max--;

Col. 11, line 60 - delete "∞";

Col. 14, line 15 - "60A" should be --60 min.--;

Col. 14, line 52, claim 1 - "$M^+$" should be --$M^{\oplus}$--;

Col. 15, line 9, claim 2 - "$M^+$" should be --$M^{\oplus}$--;

Col. 15, line 24, claim 3 - "$M^+$" should be --$M^{\oplus}$--;

Col. 16, line 27, claim 12 - insert --$C_{1-18}$-- before "tetr-";

Col. 16, line 28, claim 12 - delete "-$C_{1-18}$" after aalkyl.

Signed and Sealed this nineteenth Day of August 1975

[SEAL]

Attest:

RUTH C. MASON
Attesting Officer

C. MARSHALL DANN
Commissioner of Patents and Trademarks